United States Patent [19]

Nishizawa et al.

[11] Patent Number: 4,614,782

[45] Date of Patent: Sep. 30, 1986

[54] HEAT RESISTANT RESIN COMPOSITION

[75] Inventors: Hiroshi Nishizawa, Kitaibaraki; Shozo Kasai, Hitachi; Yasunori Okada, Hitachi; Yuichi Osada, Hitachi; Yoshiyuki Mukoyama, Hitachi, all of Japan

[73] Assignee: Hitachi Chemical Company, Ltd., Tokyo, Japan

[21] Appl. No.: 674,309

[22] Filed: Nov. 23, 1984

Related U.S. Application Data

[63] Continuation of Ser. No. 364,471, Apr. 1, 1982, abandoned.

[30] Foreign Application Priority Data

Apr. 8, 1981 [JP] Japan .................................. 56-53643
Apr. 14, 1981 [JP] Japan .................................. 56-56537

[51] Int. Cl.$^4$ ...................... C08F 283/04; C08L 71/00
[52] U.S. Cl. .................................. 525/424; 525/425; 525/432
[58] Field of Search ...................... 525/424, 425, 432

[56] References Cited

U.S. PATENT DOCUMENTS 4,319,006  3/1982  Yamada .................................. 525/425
4,431,758  2/1984  Osada et al. ........................ 525/425

FOREIGN PATENT DOCUMENTS 55-149347  11/1980  Japan .................................. 525/424
55-145758  11/1980  Japan .................................. 525/424
56-82856   7/1981   Japan .................................. 525/424

*Primary Examiner*—Wilbert J. Briggs, Sr.
*Assistant Examiner*—A. L. Carrillo
*Attorney, Agent, or Firm*—Antonelli, Terry & Wands

[57] ABSTRACT

A heat resistant resin composition comprising (A) a polyamideimide resin soluble in a cresol type solvent obtained by using a lactam as a reactant, and (B) at least one member selected from the group consisting of a polyester resin, a polyesteramide resin, a polyesterimide resin and a polyesteramideimide resin, preferably heated for conducting a reaction, gives coatings excellent in heat resistance, thermal shock resistance, wear resistance, resistance to hydrolysis, crazing resistance, etc., suitable for enamelled wire.

24 Claims, No Drawings

HEAT RESISTANT RESIN COMPOSITION

This is a continuation of application Ser. No. 364,471 filed Apr. 1, 1982, now abandoned.

This invention relates to a heat resistant resin composition.

Recently, polyester series varnishes are widely used as varnishes for electrical insulation, particularly for enamelled wire, since they have relatively balanced properties in mechanical properties, heat resistance, price, etc. But polyester wire cannot fully satisfy recent demands for (1) improvement in heat resistance for miniaturization and weight saving or increasing reliability of electric machines and devices, (2) improvement in wear (abrasion) resistance for rationalization of production of coils, (3) improvement in thermal (heat) shock resistance for shortening the heating time of impregnated varnishes, (4) improvement in resistance to hydrolysis in response to an increase of closed type machines and devices, etc. As varnishes for meeting these demands, there are proposed polyesterimide varnishes, polyesteramide varnishes, polyesteramide modified with tris(2-hydroxyethyl) isocyanurate, polyesteramideimide varnishes, polyamideimide varnishes, etc. But enamelled wire obtained by coating and baking a polyesterimide varnish is good in heat resistance and thermal shock resistance but not sufficient in crazing resistance (crazing means a phenomenon of generation of cracks on a coating film having fine strain therein caused by an influence of moisture or an organic solvent). Polyesteramide resins modified with tris(2-hydroxyethyl) isocyanurate, polyesterimide resins and polyesteramideimide resins, which are improved in heat softening properties, are still insufficient in thermal shock resistance, resistance to deterioration of breakdown voltage and wear resistance.

Polyamideimide resins are generally insoluble in a cresol type solvent which is a cheap and general purpose solvent and only soluble in a polar solvent such as expensive N-methylpyrrolidone, dimethylacetamide, etc. Further, since the polyamideimide resin itself is expensive, the resulting polyamideimide with an expensive solvent naturally becomes very expensive.

In order to improve the above-mentioned disadvantages of the polyester varnish, polyesteramide resins, polyesterimide resins, polyesteramideimide resins, and to solve the economical problem of polyamideimide resin, various proposals have been made but they are insufficient, for example, in compatibility of the resins, physical properties of the resulting coatings, transparency and gloss of the resulting film, etc.

This invention provides a heat resistant resin composition overcoming disadvantages of polyester resins, polyesteramide resins, polyesterimide resins, polyesteramideimide resins, and polyamideimide resins.

In accordance with this invention, there is provided a heat resistant resin composition comprising:

(A) a polyamideimide resin soluble in a cresol type solvent obtained by using a lactam as a reactant, and (B) at least one member selected from the group consisting of a polyester resin, a polyesteramide resin, a polyesterimide resin and a polyesteramideimide resin.

The polyamideimide resin (A) can be obtained by reacting in a cresol type solvent:

(a) a polyisocyanate containing an isocyanurate ring in an amount of 0 to 30 equivalent percents based on the total isocyanate equivalent, (b) a diisocyanate,
(c) a lactam,
(d) a tricarboxylic acid anhydride, and
(e) a compound different from the component (d) and having the formula:

wherein X and X' are carboxyl groups or acid anhydride groups and X and X' may be the same or different groups; Y is a carboxyl group, a hydroxyl group, an acid anhydride group or an amino group; n is an integer of 1 or more; R is a residue of aromatic, aliphatic, alicyclic or heterocyclic group, or a group of the formula:

in which $R_1$ and $R_2$ are independently a residue of aromatic, aliphatic, alicyclic or heterocyclic group; Z is $-CH_2-$, $-CO-$, $-SO_2-$ or $-O-$; and m and l are independently an integer of 1 or 2, in an amount of 0 to 30 equivalent percents based on the total carboxyl equivalent.

In the above formula (2), $R_1$ and $R_2$ are preferably benzene rings.

The polyisocyanate containing an isocyanurate ring (a) can be obtained by trimerization of an aromatic diisocyanate, an aliphatic diisocyanate, an alicyclic diisocyanate or a polyisocyanate. Examples of the aromatic diisocyanates are tolylene diisocyanate, xylylene diisocyanate, 4,4'-diphenylmethane diisocyanate, 4,4'-diphenylether diisocyanate, naphthalene 1,5-diisocyanate, etc. Examples of the aliphatic diisocyanates are ethylene diisocyanate, 1,4-tetramethylene diisocyanate, 1,6-hexamethylene diisocyanate, etc. Examples of alicyclic diisocyanates are cyclobutene 1,3-diisocyanate, cyclohexane 1,3-diisocyanate, cyclohexane 1,4-diisocyanate, isophorone diisocyanate, etc. Examples of polyisocyanates are triphenylmethane 4,4',4"-triisocyanate, etc. Considering heat resistance, trimerization reaction products of aromatic diisocyanates such as tolylene diisocyanate and 4,4'-diphenylmethane diisocyanate, and a trimerization reaction product of isophorone diisocyanate are preferable as the component (a). These polyisocyanates containing an isocyanurate ring may be used alone or as a mixture of two or more of them.

Processes for producing these polyisocyanates containing an isocyanurate ring are disclosed, for example, in Japanese Patent Appln. Kokoku (Post-Exam. Publn) No. 34209/81.

As the diisocyanate (b), there can be used the aromatic diisocyanates, the aliphatic diisocyanates and the alicyclic diisocyanates mentioned above for giving the component (a). Considering heat resistance, the use of an aromatic diisocyanate such as tolylene diisocyanate, 4,4'-diphenylmethane diisocyanate, 4,4'-diphenylether diisocyanate, or xylylene diisocyanate is preferable. These diisocyanates can be used alone or as a mixture thereof.

The isocyanurate ring-containing polyisocyanate (a) is used as a branching component and the isocyanurate ring skelton gives excellent heat resistance. The isocyanurate ring-containing polyisocyanate (a) is used in an amount of 0 to 30 equivalent percents based on the total isocyanate equivalent. If the amount is over 30 equivalent percents, the degree of branching is so increased that a gelation sometimes takes place before reaching to the desired molecular weight. On the other hand, the isocyanurate ring-containing polyisocyanate (a) may not be used in some cases.

The lactam (c) is an important raw material for making the polyamideimide resin soluble in a cresol type solvent. Any ones which can react with an isocyanate group or an acid anhydride group and make the resulting polymer soluble in a cresol type solvent can be used. Examples of the lactams are 2-pyrrolidone, ω-lauryllactam and ε-caprolactam. Taking solbility, reactivity and price into consideration, ε-caprolactam is preferable.

The amount of lactam is not limited particularly, but taking heat resistance into consideration, the use of 10 to 100 equivalent percents based on the total isocyanate equivalent is preferable (1 mole of the lactam being 2 equivalents). The use of the lactam in an amount of 30 to 80 equivalent percents is particularly preferable.

As the tricarboxylic acid anhydride (d), there can be used trimellitic acid anhydride, butane-1,2,4-tricarboxylic acid anhydride, etc. Considering heat resistance, the use of trimellitic acid anhydride is preferable.

The compound of the formula (1) (e), which is different from the component (d), has at least two carboxyl groups or acid anhydride groups which can be resinified by forming an amide linkage and/or imide linkage together with a polyisocyanate, and if necessary, also has a carboxyl group, a hydroxyl group, a carbonyl group, an acid anhydride group or an amino group. Taking flexibility, heat resistance, wear resistance, resistance to Freon, etc., into consideration, preferable examples of the compounds of the formula (1) are trimesic acid, tris(2-carboxyethyl) isocyanurate, 3,3′,4,4′-benzophenonetetracarboxylic acid, 1,2,3,4-butanetetracarboxylic acid, 1,2,4-butanetricarboxylic acid and their anhydrides. Further, reaction products of trimellitic anhydride and an isocyanurate ring-containing polyisocyanate as mentioned above such as a trimer of tolylene diisocyanate, a trimer of isophorone diisocyanate, etc., more concretely, a polyimide-polycarboxylic acid and the like ca be used.

These compounds of the formula (1)(e) can be used alone or as a mixture thereof. The compound (e) is used in an amount of 0 to 30 equivalent percents based on the total carboxyl equivalent. If the amount is over 30 equivalent percents, the degree of branching is so increased that a gelation sometimes takes place before reaching to the desired molecular weight. On the other hand, the compound of the formula (1)(e) may not be used in some cases.

From the viewpoints of flexibility of the resulting polyamideimide resin and transparency of a solution obtained by dissolving the resulting polyamideimide in a cresol type solvent, it is preferable to make the sum of the equivalent percent of the component (a) based on the total isocyanate equivalent and the equivalent percent of the component (e) based on the total carboxyl equivalent in the range of 3 to 30 equivalent percents. In this case 1 equivalent of each of a hydroxyl group, a carbonyl group, an acid anhydride group and an amino group in the acid components is regarded as 1 equivalent of carboxyl group.

Further, taking heat resistance and flexibility into consideration, it is preferable to use the isocyanate group-containing components (a) and (b) and the carboxyl group- or acid anhydride group-containing components (d) and (e) in terms of an equivalent ratio of carboxyl group to isocyanate group in the range of 0.6/1 to 1.5/1, more preferably 0.7/1 to 1.15/1.

The reaction can be carried out by charging all the raw materials, i.e., the components (a) to (e), to a reactor, or charging one or more raw materials stepwise depending on purposes. It is preferable to carry out the reaction at a temperature of 180°–250° C., more preferably 200° to 220° C. after charging all the components to be reacted. The progress of the reaction can be checked by measuring bubbles of carbon dioxide generated and a viscosity of the reaction solution.

As the cresol type solvent, there can be used cresol, phenol, xylenol, and the like. It is also possible to use cresylic acid, which is a mixture of these compounds. As a part of the solvent, there can be used a high boiling aromatic solvent such as xylene, NISSEKI HISOL-100, 150 (a trade name of aromatic hydrocarbons, mfd. by Nippon Petrochemicals Co., Ltd.), Cellosolve Acetate (a trademark of ethylene glycol monoethyl ether monoacetate mfd. by Dow Chemical Co.), etc.

The thus prepared polyamideimide resin solution may be diluted with a polar solvent such as a cresol type solvent mentioned above, N-methylpyrrolidone, dimethylformamide, dimethylacetamide, or the like to a resin content of 20 to 40% by weight for use as a varnish. In such a case, xylene, NISSEKI HISOL-100, Cellosolve Acetate or the like may be used together with such a solvent as mentioned above as auxiliary solvent.

When there are used as the raw materials a diisocyanate, a lactam, a tricarboxylic acid anhydride and as a branching component a tri- or higher polyfunctional polycarboxylic acid such as trimesic acid, tris(2-carboxyethyl) isocyanurate or a reaction product of an isocyanurate ring-containing polyisocyanate and trimellitic acid anhydride, the resulting polyamideimide is a branched high polymer.

Considering heat resistance, flexibility, wear resistance, price, and the like, it is preferable to use as the raw materials a diisocyanate, a lactam, a tricarboxylic acid anhydride and an isocyanurate ring-containing polyisocyanate to give a branched polyamideimide resin soluble in a cresol type solvent.

As the polyester resin used in the component (B), there is no particular limitation thereto.

For example, when there are used as starting materials terephthalic acid or its derivative as a major component of a carboxylic acid component, a dialcohol and a trihydric alcohol such as glycerine, a branched polyester resin is obtained. Such a process is disclosed in Japanese Patent Appln. Kokoku (Post-Exam. Publn) No. 1800/58.

A polyester resin produced by using as starting materials a carboxylic acid component containing terephthalic acid or its derivative as a major component, a dialcohol and tris(2-hydroxyethyl) isocyanurate is disclosed in Japanese Patent Appln Kokoku (Post-Exam. Publn) No. 28288/64.

Considering crazing resistance, thermal shock resistance, peeling resistance and cost, a polyester resin obtained by using terephthalic acid or its derivative, ethylene glycol, and glycerine is preferable.

Considering heat resistance, resistance to refrigeration, and resistance to hydrolysis, a polyester resin obtained by using terephthalic acid or its derivative, a dialcohol and tris(2-hydroxyethyl isocyanurate is preferable.

It is preferable to use 20 to 400 parts by weight of the polyamideimide resin (A) per 100 parts by weight of the polyester resin (B). When the amount of the component (A) is increased in comparison with the amount of the polyester resin (B), heat resistance, wear resistance, crazing resistance, etc., are improved, but if the amount of the component (A) is over 400 parts by weight, the varnish concentration is lowered, which disadvantageously influences on productivity and costs. On the other hand, if the amount of the compnent (A) is less than 20 parts by weight, the improvement in heat resistance becomes slightly insufficient.

The component (A) and the polyester resin (B) is preferably mixed with heating, e.g. so as to bring about a reaction to give without a phase separation a heat resistant resin composition which can give a coating film having uniform gloss, smooth surface and a uniform thickness after baking.

Usually the mixture of the component (A) and the polyester resin (B) is heated at 120°-220° C. in the presence of an ester interchange catalyst. Preferable conditions are the use of tetrabutyl titanate as ester interchange catalyst in an amount of 0.5 to 4.0% by weight based on the resin content, the temperature of 130°-180° C. and the time of several tens minutes to several hours.

Since the component (A) and the polyester resin (B) have no compatibility each other, if the component (A) and the polyester resin (B) are simply mixed, there take place clouding and phase separation.

Reasons for giving a transparent film by heating the component (A) and the polyester resin (B) seem to be that the amide linkage in the component (A) and the ester linkage in the polyester resin (B) bring about an interchange reaction mutually by heating to produce a single polyesteramideimide resin from a mixture of the polyamideimide resin and the polyester resin.

Another embodiments of this invention are to admix the polyamideimide resin (A) with at least one member selected from the group consisting of a polyesteramide resin, a polyesterimide resin and a polyesteramideimide resin (B). There is no particular limitation to the component (B) and there can be used polyesteramide resins, polyesterimide resins or polyesteramideimide resins having amide linkages, imide linkages or amideimide linkages in addition to ester linkages.

For example, a linear polyesteramide resin produced by using as starting materials a reaction product of a diisocyanate, a dicarboxylic acid monoester, a dicarboxylic acid and a dialcohol is disclosed in Japanese Patent Appln. Kokai (Laid-Open) No. 76232/76.

A polyesteramide resin produced by using as starting materials a reaction product of a diisocyanate, a dicarboxylic acid monoester, a dicarboxylic acid component containing terephthalic acid as a major component, a dialcohol and tris(2-hydroxyethyl) isocyanurate is disclosed in Japanese Patent Appln. Kokoku (Post-Exam. Publn.) No. 25220/80.

A branched polyesterimide resin produced by using as starting materials a dicarboxylic acid component containing terephthalic acid as a major component, a dialcohol, a trihydric alcohol such as glycerine, an acid anhydride and a diamine is disclosed in Japanese Patent Appln. Kokoku (Post-Exam Publn.) No. 21500/63.

A polyesterimide resin produced by using as starting materials a dicarboxylic acid component containing at least terephthalic acid as a major component, a dialcohol, tris(2-hydroxyethyl) isocyanurate, an acid anhydride and a diamine is disclosed in Japanese Patent Appln. Kokoku (Post-Exam. Publn.) No. 40113/76.

A polyesterimide resin produced by using as starting materials a dicarboxylic acid component containing terephthalic acid as a major component, a reaction product of a polyisocyanate containing an isocyanurate ring and trimellitic acid anhydride and a dialcohol is disclosed in Japanese Patent Appln. Kokai (Laid-Open) No. 141898/79.

A polyesteramideimide resin produced by using as starting materials a dicarboxylic acid component containing terephthalic acid as a major component, a dialcohol, a trihydric alcohol such as tris(2-hydroxyethyl) isocyanurate, an acid anhydride, a diamine and a reaction product of a diisocyanate and a dicarboxylic acid monoester is disclosed in Japanese Patent Appln. Kokoku (Post-Exam Publn.) No. 46480/72, etc.

Considering heat resistance (heat softening properties and thermal shock resistance), curing properties and costs, the use of polyesterimide resin obtained by using as starting materials a dicarboxylic acid component containing terephthalic acid as a major component, a dialcohol, a trihydric alcohol including tris(2-hydroxyethyl) isocyanurate, an acid anhydride and a diamine is preferable.

It is preferable to use 1 to 400 parts by weight of the component (A) based on 100 parts by weight of the component (B), i.e., at least one of polyesteramide resin, polyesterimide resin and polyesteramideimide resin. When the amount of the component (A) is increased in comparison with the amount of the component (B), heat resistance, wear resistance, and crazing resistance are improved, but too much amount of the component (A) is not preferable considering costs, etc.

The component (A) and the component (B) can be mixed by any method so long as a uniform mixing without causing phase separation is possible. A preferable mixing method is to conduct a heat reaction of the component (A) and the component (B) at a temperature of 120° to 220° C. in the presence of an ester interchange catalyst. A more preferable mixing method is to conduct a heat reaction of the component (A) and the component (B) at a temperature of 130° to 180° C. in the presence of tetrabutyl titanate as the ester interchange catalyst in an amount of 0.5 to 4.0% by weight based on the resin content for several tens minutes to several hours. According to this method, a uniform and transparent varnish can be obtained. Reasons for this seem to be that the amide linkage in the component (A) and the ester linkage in the component (B) bring about an interchange reaction mutually by heating to produce a single polyesteramideimide resin. Since the component (A) and the component (B) contain amide linkages and/or imide linkages in the polymer skeltons individually, they are rich in compatibility each other and can give a smooth film with a uniform thickness, when applied to, for example, producing enamelled wire.

The thus obtained heat resistant resin composition can be diluted with a polar solvent mentioned above such as the cresol type solvent mentioned above, N-methylpyrrolidone, dimethylformamide, dimethylacetamide, etc., to a resin content of 20 to 60% by weight, for example in the case of using as a varnish. In this case, considering the resin content and the viscosity, there may be used as auxiliary solvent xylene, NISSEKI HISOL-100, Cellosolve Acetate, etc.

Further, the heat resistant resin composition of this invention may contain one or more improvers in an amount of 0.1 to 25% by weight based on the resin content, such as an epoxy resin, an alkoxy modified amino resin, a phenol-formaldehyde resin, an isocyanurate ring-containing polyisocyanate, a metal salt of organic acid, a polyester resin, a polyamide resin, a polyimide resin, a polyhydration resin, a polysulfone resin, guanidine carbonate, benzotriazole, a furan resin, a phenoxy resin, a urethane elastomer, a polybutadiene resin, a nitrile-butadiene rubber, an acrylate rubber, etc.

Coating films obtained by using the heat resistant resin composition of this invention are excellent not only in flexibility but also in heat resistance, wear resistance, and crazing resistance, so that the composition can be used for producing enamelled wire mainly as well as heat resistant varnishes, heat resistant adhesives, heat resistant laminate materials, etc.

In the case of using the heat resistant resin composition for producing enamelled wire, said composition diluted with a solvent as mentioned above to a suitable resin content is coated on an electric conductor directly or together with other insulating coatings and baked using conventional techniques and conventional conditions.

This invention is illustrated by way of the following Examples.

REFERENCE EXAMPLE 1

| Ingredients | Grams | Moles |
| --- | --- | --- |
| Dimethyl terephthalate | 518.0 | 2.67 |
| Ethylene glycol | 113.0 | 1.83 |
| Glycerine | 92.0 | 1.0 |
| Tetrabutyl titanate (catalyst) | 0.72 | |
| Cresol | 38.0 | |

The ingredients mentioned above were placed in a four-necked flask equipped with a thermometer, a stirrer, and a fractional distillation tube and heated to 150° C. under a nitrogen stream. The reaction temperature was raised to 230° C. over 6 hours, while removing the methanol generated by the reaction. The reaction was further continued at 230° C. until a gelation time measured on a hot plate at 250° C. became 160 sec or less. Cresol was added to the resulting hot resin to make the resin content 50% by weight. Further, the resin solution was maintained at 120° C. and 3% by weight based on the resin component of tetrabutyl titanate was gradually added to the resin solution, followed by stirring for 30 minutes to give a polyester varnish.

REFERENCE EXAMPLE 2

| Ingredients | Grams | Moles |
| --- | --- | --- |
| Dimethyl terephthalate | 426.8 | 2.20 |
| Ethylene glycol | 62.0 | 1.0 |
| Tris(2-hydroxyethyl) isocyanurate | 323.6 | 1.24 |
| Tetrabutyl titanate | 0.81 | |
| Cresol | 91.0 | |

The above-mentioned ingredients were placed in a four-necked flask equipped with a thermometer, a stirrer, a fractional distillation tube and heated to 150° C. under a nitrogen stream. The reaction temperature was raised to 220° C. over 6 hours, while removing the methanol generated by the reaction. The reaction was further continued at 220° C. until a gelation time measured on a hot plate at 250° C. became 120 sec or less. Cresol was added to the resulting hot resin to make the resin content 45% by weight. Further, tetrabutyl titanate in an amount of 4% by weight based on the resin component was gradually added to the resin solution maintained at 120° C. to give a polyester varnish.

REFERENCE EXAMPLE 3

(1) Synthesis of a polyisocyanate containing an isocyanurate ring.

| Ingredients | Grams |
| --- | --- |
| Tolylene diisocyanate | 600 |
| Xylene | 600 |
| 2-Dimethylaminoethanol (catalyst) | 1.8 |

The above-mentioned ingredients were placed in a four-necked flask equipped with a thermometer, and a stirrer and heated to 140° C. under a nitrogen stream. The reaction was proceeded at that temperature until the isocyanate group content became 25% by weight (the initial content 48% by weight).

The resulting compound had absorptions at 1710 cm$^{-1}$ and 1410 cm$^{-1}$ due to an isocyanurate ring and at 2260 cm$^{-1}$ due to an isocyanate group in infrared spectrum.

(2) Synthesis of polyamideimide resin soluble in a cresol type solvent

| Ingredients | Grams | Equivalent |
| --- | --- | --- |
| Polyisocyanate containing an isocyanurate ring synthesized in (1) | 30.0 | 0.09 |
| 4,4'-Diphenylmethane diisocyanate | 113.3 | 0.91 |
| Trimellitic anhydride | 96.0 | 1.00 |
| ε-Caprolactam | 36.6 | 0.65 |
| Cresol | 300 | |

The above-mentioned ingredients except for trimellitic anhydride were placed in a four-necked flask equipped with a thermometer, a stirrer, and a fractional distillation tube and heated to 180° C. under a nitrogen stream. After reacted at that temperature for 90 minutes, trimellitic anhydride was added to the reaction solution and heated to 210° C. The reaction was carried out at 210° C. for 15 hours. Then cresol was added to the reaction solution to make the resin content 30% by weight to give a varnish. Said varnish had a viscosity of 250 poises at 30° C.

In infrared spectrum, there were admitted an absorption at 1780 cm$^{-1}$ due to an imide group and an absorption at 1650 cm$^{-1}$ due to an amide group.

REFERENCE EXAMPLE 4

| Ingredients | Grams | Equivalent |
| --- | --- | --- |
| 4.4'-Diphenylmethane diisocyanate | 125.0 | 1.0 |
| Trimellitic anhydride | 89.3 | 0.93 |
| 3,3',4,4'-Benzophenonetetracarboxylic acid dianhydride | 11.3 | 0.07 |
| ε-Caprolactam | 28.3 | 0.50 |
| Cresol | 254.0 | |
| Xylene | 5.0 | |

The above-mentioned ingredients except for trimellitic anhydride and ε-caprolactam were placed in a four-necked flask equipped with a thermometer, a stirrer and a fractional distillation tube and reacted at 200° C. for 1 hour in a nitrogen stream. After cooling to 160° C., ε-caprolactam and trimellitic anhydride were added to the reaction solution and the temperature was raised to the reflux temperature of cresol. The reaction was carried out at that temperature for 9 hours. Then, cresol was added to the resulting solution to give a varnish having a resin content 30% by weight.

REFERENCE EXAMPLE 5

| Ingredients | Grams | Equivalent |
|---|---|---|
| Trimesic acid | 6.3 | 0.09 |
| Trimellitic anhydride | 91.2 | 0.95 |
| 4,4'-Diphenylmethane diisocyanate | 125.0 | 1.0 |
| ε-Cuprolactam | 33.9 | 0.60 |
| Cresol | 170.5 | |
| Xylene | 5.0 | |

The above-mentioned ingredients except for trimellitic anhydride and trimesic acid were placed in a four-necked flask equipped with a thermometer, a stirrer and a fractional distillation tube and reacted at 180° C. for 90 minutes in a nitrogen stream. After cooling to 160° C., trimesic acid and trimellitic anhydride were added to the reaction solution and the temperature was raised to the reflux temperature of cresol. The reaction was carried out at that temperature for 10 hours. Then, cresol was added to the resulting solution to give a polyamideimide varnish having a resin content of 30% by weight.

REFERENCE EXAMPLE 6

A polyesterimide varnish (Isomid, a trade name, mfd. by Nisshoku-Schenectady Co., Ltd.) obtained from terephthalic acid, imidedicarboxylic acid, tris(2-hydroxyethyl) isocyanurate and ethylene glycol was used.

EXAMPLE 1

To 100 parts by weight of polyester varnish obtained in Reference Example 1 (calculated based on the solid resin content), 185 parts by weight of polyamideimide varnish obtained in Reference Example 3 (calculated based on the solid resin) was added and reacted with heating at 170° C. for 6 hours. A sample was taken out and coated on a glass plate and dried with heating at 240° C. for 15 minutes to identify that the resulting coating film is brown and transparent. Then, the temperature was lowered to 150° C. and the resin content was lowered to 33% by weight with cresol, followed by addition of 0.5% by weight of tetrabutyl titanate based on the solid resin at 110° C. with stirring for 30 minutes to give a heat resistant resin composition. Said resin composition had a resin content of 32% by weight and a viscosity of 46 poises at 30° C.

EXAMPLE 2

To the polyester varnish obtained in Reference Example 2 in an amount of 100 parts by weight (calculated based on the solid resin content), the polyamideimide varnish obtained in Reference Example 4 in an amount of 100 parts by weight (calculated based on the solid resin content) was added and reacted with heating at 160° C. for 4 hours. Subsequently, the temperature was lowered to 150° C. and the resin content was lowered to 34% by weight with xylene, followed by addition of 0.8% by weight of tetrabutyl titanate based on the solid resin at 110° C. with stirring for 30 minutes to give a heat resistant resin composition. Said resin composition had a resin content of 34% by weight and a viscosity of 52 poises at 30° C.

EXAMPLES 3 to 8

Heat resistant resin compositions were prepared by using starting materials and reaction conditions as listed in Table 1.

TABLE 1

| | Example No. | 1 | 2 | 3 | 4 | 5 | 6 | 7 | 8 |
|---|---|---|---|---|---|---|---|---|---|
| Starting | Reference Example 1 | 100 | | 100 | 100 | 100 | | | |
| varnish | Reference Example 2 | | 100 | | | | 100 | 100 | 100 |
| (Parts by wt. | Reference Example 3 | 185 | | 100 | 54 | 20 | | | |
| based on | Reference Example 4 | | 100 | | | | 150 | 60 | |
| solid resin content) | Reference Example 5 | | | | | | | | 120 |
| Reaction | Temperature (°C.) | 170 | 160 | 170 | 170 | 170 | 160 | 160 | 170 |
| conditions | Time (hrs) | 6 | 4 | 5 | 6 | 7 | 5 | 6 | 5 |
| Tetrabutyl titanate (% by wt. based on solid resin) | | 0.5 | 0.8 | 1.0 | 1.5 | 1.5 | 0.8 | 1.4 | 1.1 |
| Properties of resulting varnish | Resin content (% by wt.) | 32 | 34 | 35 | 36 | 40 | 31 | 35 | 32 |
| | Viscosity (poises, 30° C.) | 46 | 52 | 37 | 41 | 43 | 54 | 42 | 43 |

Each of the thus prepared varnishes was coated on soft copper wire having a diameter of 1.0 mm 8 times and baked in a vertical furnace having a length of 4.5 m and heated at 300° C. at a lower portion and 400° C. at an upper portion to give enamelled wire having a coating film thickness of 0.038–0.040 mm.

Properties of the thus obtained enamelled copper wire were tested and listed in Table 2.

TABLE 2

| Properties | Test conditions | Example 1 | Example 2 | Example 3 | Example 4 | Example 5 | Example 6 |
|---|---|---|---|---|---|---|---|
| Flexibility | Mandrel test | 1X OK | 1X OK | 1X OK | 1X OK | 1X OK | 1X OK |
| Abrasion resistance | Load 600 g (repeated scrape times) | 100 | 80 | 85 | 60 | 50 | 85 |
| Heat shock resistance | Temperature passing the Mandrel test after aging for 1 hr. (°C.) | 300 | 260 | 280 | 260 | 220 | 300 |
| Dielectric | Normal state (KV) | 13.0 | 12.0 | 12.0 | 13.5 | 12.0 | 12.5 |

TABLE 2-continued

| | | | | | | | |
|---|---|---|---|---|---|---|---|
| breakdown strength | After heat aging at 240° C. for 168 hrs (KV) | 9.9 | 9.6 | 5.5 | 4.7 | 3.1 | 12.6 |
| | Retention rate (%) | 76 | 80 | 46 | 35 | 26 | 100 |
| Cut through resistance | Cut through temp. load 700 g (°C.) | 365 | 390 | 350 | 340 | 335 | 400 |
| | IEEE No. 57 Life test | | | | | | |
| Heat resistance | Av. life time at 260° C. (hrs) | 500 | 730 | 230 | 160 | 110 | 840 |
| | Av. life time at 240° C. (hrs) | 1300 | 2200 | 1050 | 870 | 410 | 2300 |
| Crazing resistance | 30% elongation, pin hole test (good or bad) | Good | Good | Good | Good | Good | Good |
| Resistance to hydrolysis | Retention rate*[1] (%) | 70 | 70 | 55 | 45 | 36 | 80 |
| | R-22*[2] blister test Blistering | | | | | | |
| Resistance to Freon | Temp. 130° C. - 10 min. | Good | Good | — | — | — | Good |
| | 150° C. - 10 min. | Good | Good | — | — | — | Good |

| Properties | Test conditions | Example 7 | Example 8 | Reference Example 1 | Reference Example 2 | Reference Example 6 |
|---|---|---|---|---|---|---|
| Flexibility | Mandrel test | 1X OK | 1X OK | 1X OK | 1X OK | 1X OK |
| Abrasion resistance | Load 600 g (repeated scrape times) | 55 | 80 | 40 | 35 | 30 |
| Heat shock resistance | Temperature passing the Mandrel test after aging for 1 hr. (°C.) | 200 | 240 | 130 | 160 | 220 |
| Dielectric breakdown strength | Normal state (KV) | 12.7 | 13.0 | 12.7 | 12.0 | 12.5 |
| | After heat aging at 240° C. for 168 hrs (KV) | 11.3 | 12.6 | 1.6 | 4.2 | 10.6 |
| | Retention rate (%) | 89 | 97 | 13 | 35 | 85 |
| Cut through resistance | Cut through temp. load 700 g (°C.) | 370 | 390 | 330 | 370 | 390 |
| | IEEE No. 57 Life test | | | | | |
| Heat resistance | Av. life time at 260° C. (hrs) | 530 | 630 | 80 | 260 | 550 |
| | Av. life time at 240° C. (hrs) | 1750 | 1900 | 230 | 950 | 1700 |
| Crazing resistance | 30% elongation, pin hole test (good or bad) | Good | Good | Good | Bad | Bad |
| Resistance to hydrolysis | Retention rate*[1] (%) | 65 | 83 | 25 | 40 | 50 |
| | R-22*[2] blister test Blistering | | | | | |
| Resistance to Freon | Temp. 130° C. - 10 min. | Good | Good | — | Blistered | Good |
| | 150° C. - 10 min. | Blistered | Good | — | Blistered | Blistered |

Note to Table 2:

*[1] Retention rate = $\frac{\text{Breakdown voltage after deterioration}}{\text{Breakdown voltage at normal state}} \times 100(\%)$ Deterioration was conducted by subjecting a sample to heating at 180° C. for 2 hours in 2 ml of water placed in a closed pressure vessel having an inner volume of 670 ml (water volume: 0.3% of the inner volume).

*[2] In an autoclave having an inner volume of 1000 ml, 350 g of R-22, 350 g of refrigerator oil and a model coil were placed and heated at 125° C. for 168 hours. Then the autoclave was opened and the model coil was immediately transferred to a drier heated at 130° C. or 150° C. and heated for 10 minutes to observe blisters.

As is clear from Table 2, Examples 1 and 3 to 5 wherein the polyamideimide resin of Reference Example 3 soluble in a cresol type varnish obtained by using a lactam as one reactant is reacted with the polyester resin of Reference Example 1 with heating are improved remarkably in heat shock resistance compared with Reference Example 1. When the polyamideimide resin content is high as shown in Examples 1 and 3, the heat resistance, resistance to hydrolysis and abrasion resistance are particularly improved.

Further, Examples 2 and 6 to 8 wherein the polyester varnish obtained in Reference Example 2 is reacted with a polyamideimide varnish obtained in Reference Example 4 or 5 with heating are remarkably improved in the heat shock resistance, heat resistance, crazing resistance, resistance to hydrolysis compared with Reference Example 2. Further, Examples 2 and 6 to 8 are also markedly improved in refrigerator resistance, crazing resistance and resistance to hydrolysis compared with Reference Example 6 wherein the polyesterimide resin commercially available is used.

As mentioned above, by using the heat resistant resin composition obtained by reacting the special polyamideimide resin with a polyester resin, properties of conventional polyester resins and polyesterimide resins are improved remarkably.

REFERENCE EXAMPLE 7

| Ingredients | Grams | Moles |
|---|---|---|
| (A) Components | | |
| Monomethyl terephthalate | 109.3 | 0.607 |
| 4,4'-Diphenylmethane diisocyanate | 75.9 | 0.304 |
| N—Methylpyrrolidone | 123.5 | |
| (B) Components | | |
| Ethylene glycol | 107.1 | 1.727 |
| Tris(2-hydroxyethyl) isocyanurate | 350.0 | 1.341 |
| Dimethyl terephthalate | 459.2 | 2.367 |
| Tetrabutyl titanate (catalyst) | 1.1 | |
| Cresol | 70.0 | |

The above-mentioned components (A) were placed in a four-necked flask equipped with a thermometer, a stirrer, and a fractional distillation tube and reacted at 100° C. for 3 hours in a nitrogen stream. Subsequently, the temperature was raised to 150° C. and the reaction was continued at that temperature until there was no generation of carbon dioxide gas. Then, the components (B) were placed in the flask and the reaction was carried out at 180°-200° C. until almost no methanol is generated by the reaction. Subsequently the temperature was raised to 220° C. and the reaction was conducted at that temperature until a gelation time measured on a hot plate at 250° C. became 120 sec or less. To the resulting hot resin, a mixed solvent of cresol/NISSEKI HISOL-100=8/2 (weight ratio) was added to make the resin content 30% by weight. Further, while maintaining the resin solution at 110° C., 5% by weight of tetrabutyl titanate based on the resin content was gradually added to the resin solution with stirring for 30 minutes to give a polyesteramide varnish.

REFERENCE EXAMPLE 8

Using the same ingredients as mentioned in Reference Example 4, the reaction was conducted in the same manner as described in Reference Example 4. The resulting resin solution was diluted with cresol so as to make the resin content 25% by weight. The resulting transparent polyamideimide varnish had a viscosity of 75 poises at 30° C. and a reduced viscosity of 0.27 (0.5 g of the resin in 100 ml of dimethylformamide solution, 30° C.).

REFERENCE EXAMPLE 9

Using the same ingredients as mentioned in Reference Example 5 except for using 5.6 g (0.08 equivalent) of trimesic acid in place of 6.3 g (0.09 equivalent), the reaction was conducted in the same manner as described in Reference Example 5. The resulting resin solution was diluted with cresol to make the resin conten 23% by weight. The resulting polyamideimide varnish had a viscosity of 83 poises at 30° C. and a reduced viscosity of 0.28 (0.5 g of the resin in 100 ml of dimethylformamide solution).

EXAMPLE 9

To the polyesteramide varnish obtained in Reference Example 7 in an amount of 100 parts by weight (based on the solid resin content), the polyamideimide varnish obtained in Reference Example 3 in an amount of 65 parts by weight (based on the solid resin content) was added and heated at 160° C. with stirring until a uniform heat resistant resin composition was obtained.

EXAMPLE 10

To the polyesterimide varnish of Reference Example 6 (Isomid) in an amount of 100 parts by weight (based on the solid resin content), the polyamideimide varnish obtained in Reference Example 3 in an amount of 65 parts by weight (based on the solid resin content) and 2 parts by weight of tetrabutyl titanate were added and heated at 160° C. with stirring until a uniform transparent heat resistant resin composition was obtained.

EXAMPLE 11

To the polyesteramide varnish obtained in Reference Example 7 in an amount of 100 parts by weight (based on the solid resin content), the polyamideimide varnish obtained in Reference Example 8 in an amount of 200 parts by weight (based on the solid resin content) was added and heated at 160° C. with stirring until a uniform heat resistant resin composition was obtained.

EXAMPLE 12

To the polyesterimide varnish of Reference Example 6 (Isomid) in an amount of 100 parts by weight (based on the solid resin content), the polyamideimide varnish obtained in Reference Example 9 in an amount of 30 parts by weight (based on the solid resin content) was added and heated at 160° C. with stirring until a uniform and transparent heat resistant resin composition was obtained.

The thus obtained varnishes were coated on copper wire by a conventional method and properties of the resulting enamelled wire were tested and the results were listed in Table 3.

TABLE 3

| Example No. | Flexibility[1] (no elongation) Mandrel test | Abrasion resistance[1] (repeated scrape times) | Heat resistance Heat shock resistance[1] Temp. passing the Mandrel test after aging for 1 hr. (°C.) | BDV retention rate[2] (%) 240° C. | 260° C. |
|---|---|---|---|---|---|
| Reference Example 7 | 1X OK | 30 | 180 | 40 | 20 |
| Reference Example 6 | 1X OK | 30 | 200 | 80 | 50 |
| Example 9 | 1X OK | 63 | 240 | 85 | 63 |
| Example 10 | 1X OK | 60 | 300 | 100 | 70 |
| Example 11 | 1X OK | 80 | 300 | 100 | 80 |
| Example 12 | 1X OK | 45 | 210 | 90 | 50 |

Note to Table 3:
Baking conditions:
Diameter of wire: 1 mm, coated 8 times.
Furnace length: 4.5 m
Furnace temp.: inlet 300° C. middle 350° C. outlet 400° C.
Linear speed: 10 m/min.
[1]Flexibility, abrasion resistance and heat shock resistance were measured according to JIS C 3003.
[2]Retention rate of dielectric breakdown strength after aging at 240° C. for 168 hours based on the initial value.

As is clear from Table 3, the heat resistant resin compositions of Examples 9 to 12 containing the polyamideimide resin soluble in a cresol type solvent obtained by using a lactam as one reactant are improved in abrasion resistance and heat resistance (heat shock resistance, BDV retention rate) compared with the polyesteramide resin of Reference Example 7 and the polyesterimide resin of Reference Example 6. Particularly, when the content of the polyamideimide resin is high, the improvement is remarkable in Example 9, 10 and 11.

As mentioned above, the heat resistant resin composition obtained by reacting the polyamideimide resin (A) with a polyester resin is improved in thermal shock resistance, heat resistance, crazing resistance, and resistance to hydrolysis compared with conventional polyester resins. Further, the heat resistant resin composition obtained by mixing the polyamideimide resin (A) with at least one member selected from the group consisting of a polyesteramide resin, a polyesterimide resin and polyesteramideimide resin preferably with heating, e.g. for conducting a reaction, is improved in flexibility, heat resistance, and wear resistance compared with conventional polyesteramide, polyesterimide and polyesteramideimide resins. In addition, since the heat resistant resin composition of this invention has good compatibility with other resins, it is useful industrially and has a high evaluation industrially.

What is claimed is:

1. A heat resistant resin coating composition comprising:
   (A) a polyamideimide resin obtained by reacting the following components in a phenolic solvent:
      (a) A polyisocyanate containing an isocyanurate ring in an amount of 0 to 30 equivalent percents based on the total isocyanate equivalent;
      (b) a diisocyanate free of an isocyanurate ring;
      (c) a lactam;
      (d) a tricarboxylic acid anhydride, and
      (e) a compound different from the component (d) and having the formula:

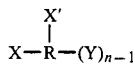   (1)

wherein X and X' are independently a carboxyl group or an acid anydride group; Y is a carboxyl group, a hydroxyl group, and acid anhydride group or an amino group; n is an integer of 1 or more; r is a residue of aromatic aliphatic, alicyclic or heterocyclic group, or a group of the formula:

   (2)

in which $R_1$ and $R_2$ are independently a residue of aromatic, aliphatic, alicyclic or heterocyclic group; Z is $-CH_2-$, $-CO-$, $-SO_2-$ or $-O-$; and m and l are independently an integer of 1 or 2, in an amount of 0 to 30 equivalent percents based on the total carboxyl equivalent; said polyamideimide resin (A) being a branched polyamideimide obtained from components (b), (c) and (d) and at least one of components (a) and (e), and
   (B) at least one member selected from the group consisting of a polyester resin, a polyesteramide resin, a polyesterimide resin and a polyesteramideimide resin; the component (B) and the (A) being reacted with each other at a temperature of 120° to 220° C. in the presence of an ester interchange catalyst and said phenolic solvent; the amount of the component (A) being 1 to 400 parts by weight based on 100 parts by weight on the component (B).

2. A composition according to claim 1, wherein the amount of ester interchange catalyst in said composition is 0.5 to 4.0% by weight based on the resin content.

3. A composition according to claim 1, wherein the component (B) is a polyester resin.

4. A composition according to claim 1, wherein the component (B) is a polyesteramide resin, a polyesterimide resin, a polyesteramideimide resin or a mixture thereof.

5. A composition according to claim 3, wherein the amount of the component (A) is 20 to 400 parts by weight based on 100 parts by weight of the component (B).

6. A composition according to claim 1, wherein the polyisocyanate containing an isocyanurate ring (a) is one obtained by trimerization of an aromatic diisocyanate, an aliphatic diisocyanate, an alicyclic diisocyanate or a polyisocyanate.

7. A composition according to claim 6, wherein the aromatic diisocyanate is tolylene diisocyanate or 4,4'-diphenylmethane diisocyanate and the alicyclic diisocyanate is isophorone diisocyanate.

8. A composition according to claim 1, wherein the diisocyanate (b) is 4,4'-diphenylmethane diisocyanate, 4,4'-diphenylether diisocyanate, tolylene diisocyanate or xylene diisocyanate.

9. A composition according to claim 1, wherein the lactam (c) is ε-caprolactam.

10. A composition according to claim 1, wherein the tricarboxylic acid anhydride (d) is trimellitic anhydride.

11. A composition according to claim 1, wherein the compound of the formula (1) is trimesic acid, tris(2-carboxyethyl) isocyanurate, 3,3',4,4'-benzophenonetetracarboxylic acid, 1,2,3,4-butanetetracarboxylic acid, 1,2,4-butanetricarboxylic acid, or an anhydride thereof.

12. A composition according to claim 1, wherein the component (B) is obtained by using tris(2-hydroxyethyl) isocyanurate as a reactant.

13. A composition according to claim 1, which further comprises a polar solvent so as to make the resin content 20 to 60% by weight.

14. A composition according to claim 1, wherein the amount of lactam (c) is 10 to 100 equivalent percents based on the total isocyanate equivalent.

15. A composition according to claim 1, wherein the sum of the equivalent percent of the component (a) based on the total isocyanate equivalent and the equivalent percent of the component (e) based on the total carboxyl equivalent is in the range of 3 to 30 equivalent percents.

16. A composition according to claim 1, wherein the polyamideimide (A) is branched one obtained from a polyisocyanate containing an isocyanurate ring, a diisocyanate, a lactam, and a tricarboxylic acid anhydride.

17. A composition according to claim 2, wherein the ester interchange catalyst is tetrabutyl titanate and the reaction between component (A) and component (B) is conducted at 130°-180° C. for several minutes to several hours.

18. A composition according to claim 1, wherein said phenolic solvent comprises cresol, phenol, xylenol or mixtures thereof alone or admixtures thereof with a high boiling aromatic solvent or admixtures thereof with the high boiling aromatic solvent and a polar solvent.

19. A composition according to claim 18, wherein said high boiling aromatic solvent is xylene or ethylene glycol monoethylether monoacetate and the polar solvent is N-methyl pyrrolidione, dimethylformamide, or dimethylacetamide.

20. A composition according to claim 14, wherein the amount of isocyanurate ring-containing polyisocyanate is 3 to 30 equivalent percents based on the total isocyanate equivalent.

21. A composition according to claim 14, wherein the isocyanate group-containing components (a) and (b) and the carboxyl group or acid anhydride group containing components (d) and (e) in terms of an equivalent ratio of carboxyl group to isocyanate group is in the range of 0.6/1 to 1.5/1.

22. A composition according to claim 14 wherein the amount of the compound (e) is 3 to 30 equivalent percents based on the total carboxyl equivalent.

23. A composition according to claim 20 wherein the isocyanate group-containing components (a) and (b) and the carboxyl group or acid anhydride group containing components (d) and (e) in terms of an equivalent ratio of carboxyl group to isocyanate group is in the range of 0.6/1 to 1.5/1.

24. A composition according to claim 23, wherein the amount of the compound (e) is 3 to 30 equivalent percents based on the total carboxyl equivalent.

* * * * *